(12) United States Patent
Sprenger et al.

(10) Patent No.: US 12,145,475 B2
(45) Date of Patent: Nov. 19, 2024

(54) LONGITUDINAL ADJUSTER, METHOD FOR ASSEMBLING A LONGITUDINAL ADJUSTER, AND VEHICLE SEAT

(71) Applicant: ADIENT US LLC, Plymouth, MI (US)

(72) Inventors: Erik Sprenger, Wermelskirchen (DE); Maros Rovny, Adamovske Kochanovce (SK)

(73) Assignee: Adient US LLC, Plymouth, MI (US)

( * ) Notice: Subject to any disclaimer, the term of this patent is extended or adjusted under 35 U.S.C. 154(b) by 0 days.

(21) Appl. No.: 18/247,667

(22) PCT Filed: Oct. 15, 2021

(86) PCT No.: PCT/IB2021/059515
§ 371 (c)(1),
(2) Date: Apr. 3, 2023

(87) PCT Pub. No.: WO2022/079685
PCT Pub. Date: Apr. 21, 2022

(65) Prior Publication Data
US 2024/0017642 A1    Jan. 18, 2024

(30) Foreign Application Priority Data

Oct. 16, 2020   (DE) .................... 10 2020 127 390.8
Jan. 14, 2021   (DE) .................... 10 2021 100 601.5

(51) Int. Cl.
*B60N 2/02*     (2006.01)
*B60N 2/06*     (2006.01)

(52) U.S. Cl.
CPC ......... *B60N 2/02246* (2023.08); *B60N 2/067* (2013.01); *B60Y 2304/074* (2013.01)

(58) Field of Classification Search
CPC ............................ B60N 2/02246; B60N 2/067
(Continued)

(56) References Cited

U.S. PATENT DOCUMENTS

| | | | | |
|---|---|---|---|---|
| 5,193,868 A | * | 3/1993 | O'Toole | ................ F16B 37/044 |
| | | | | 292/341.15 |
| 6,065,614 A | * | 5/2000 | Gunther | ............... H05K 7/1425 |
| | | | | 411/399 |

(Continued)

FOREIGN PATENT DOCUMENTS

| | | |
|---|---|---|
| DE | 102005023095 A1 | 12/2005 |
| DE | 102006000193 A1 | 10/2006 |

(Continued)

OTHER PUBLICATIONS

PCT International Search Report and Written Opinion (PCT/IB2021/059515).

(Continued)

*Primary Examiner* — Christopher Garft
(74) *Attorney, Agent, or Firm* — Marshall & Melhorn, LLC (57) ABSTRACT

A longitudinal adjuster having at least one rail pair, formed from a first rail and a second rail. The first and second rails are displaceable relative to each other and fit around each other to form an inner channel. A spindle nut is connected to the second rail and a spindle is operatively connected to the spindle nut and are arranged in the inner channel. The spindle nut is fixed on the second rail by a first fixing element and an second fixing element. The spindle nut is centered perpendicular to a longitudinal extent of the second rail by the two fixing elements. A method for assembling the longitudinal adjuster to a vehicle seat are described.

8 Claims, 4 Drawing Sheets

(58) Field of Classification Search
USPC .......... 248/429; 411/184–185, 187, 425–426
See application file for complete search history.

(56) References Cited

U.S. PATENT DOCUMENTS

| | | | |
|---|---|---|---|
| 6,971,620 B2 | 12/2005 | Moradell et al. | |
| 2005/0150317 A1* | 7/2005 | Desquesne | B60N 2/02246 |
| | | | 74/89.36 |
| 2005/0214099 A1 | 9/2005 | Silvestro et al. | |
| 2017/0114814 A1* | 4/2017 | Maloney | F16B 37/068 |
| 2018/0304777 A1* | 10/2018 | Ito | B60N 2/0727 |
| 2021/0060448 A1* | 3/2021 | Sullivan | A63H 33/108 |

FOREIGN PATENT DOCUMENTS

| | | |
|---|---|---|
| DE | 102006011717 A1 | 10/2006 |
| DE | 102008024141 A1 | 11/2009 |
| DE | 102013224459 A1 | 5/2015 |
| DE | 102017218492 A1 | 2/2019 |
| DE | 102019122928 B3 | 10/2020 |
| GB | 2218171 A | 11/1989 |
| JP | 2008056003 A | 3/2008 |

OTHER PUBLICATIONS

GPTO First Office Action in application No. 102021100601.5, dated Jun. 16, 2021, 6 pages, Munich, Germany.
GPTO Second Office Action in application No. 102021100601.5, dated Dec. 16, 2021, 4 pages, Munich, Germany.

* cited by examiner

LONGITUDINAL ADJUSTER, METHOD FOR ASSEMBLING A LONGITUDINAL ADJUSTER, AND VEHICLE SEAT

FIELD

The invention relates to a longitudinal adjuster, having at least one pair of rails formed by a first rail and a second rail, wherein the first rail and the second rail, in particular in a longitudinal direction, are displaceable relative to each other, wherein the first rail and the second rail, while forming an internal duct, alternatingly encompass each other, wherein disposed in the internal duct are a spindle nut, connected to the second rail, and a spindle, operatively connected to the spindle nut; wherein disposed on the first rail is a spindle drive which is able to be driven by a motor and interacts with the spindle, wherein the spindle nut is fixed to the second rail by a first fixing element and a second fixing element. The invention furthermore relates to a method for assembling such a longitudinal adjuster and to a vehicle seat.

BACKGROUND

Known from DE 10 2017 218 492 A1 is a generic longitudinal adjuster for a vehicle seat, the longitudinal adjuster having at least one pair of rails formed by a first seat rail and a second seat rail which in the longitudinal direction is displaceable relative to the first seat rail, wherein the seat rails while forming an internal duct alternatingly encompass each other, wherein disposed in the internal duct is a spindle nut, mounted by the second seat rail, and a spindle, operatively connected to the spindle nut, wherein disposed on a front end of the first seat rail is a gearbox which is able to be driven by a motor and interacts with the spindle, wherein the spindle on a front end portion of the spindle is mounted in the gearbox and on a rear end portion of the spindle is mounted in a rotary bearing of the first seat rail. The spindle nut is fixed to the second rail by two fixing elements.

Known from DE 10 2005 023 095 A1 is a drive device for a motor vehicle seat in a sliding device. The drive device for use in a motor vehicle seat sliding device comprises matching fixed and movable rail parts which can be moved between a front position and a rear position. The drive device comprises an extend-length spindle, a spindle nut, a gearbox and an installation device. The spindle defines a spindle axis and has a spindle thread extending in the longitudinal direction. The spindle nut can be securely fastened to a first rail part and has an internal thread which can engage in the spindle thread. The gearbox can be assembled on a respective other rail part and rotates the spindle selectively about the spindle axis. The spindle of the drive device is provided with a spindle wheel which in the assembled state of the drive device extends outward, through the spindle wheel openings of the movable rail part.

A seat sliding device which has a system with a floating threaded spindle and a stationary nut is known from DE 10 2006 000 193 A1. The nut is fastened to the lower rail, while the threaded spindle as a result of the nut rotates such that the upper structure can move forward and rearward. As soon as this system is applied, the nut is fastened to the lower rail.

A longitudinal adjuster having at least one pair of rails, formed by a second rail and a first rail which in the longitudinal direction is displaceable relative to the second rail is known from DE 10 2019 122 928 B3, wherein the rails while forming an internal duct alternatingly encompass each other, wherein disposed in the internal duct are a spindle nut, mounted by the second rail, and a spindle, operatively connected to the spindle nut, wherein a gearbox which is able to be driven by a motor and interacts with the spindle is disposed on a first end of the rail. The spindle nut is connected to the second rail by two crash pins, wherein an encircling gap is in each case provided between each of the crash pins and the second rail.

An electric seat sliding device having a lower rail and an upper rail, wherein the upper rail is displaceable relative to the lower rail, and a spindle which is rotatably mounted on an inside of the upper rail, and a nut element which is screwed onto the spindle and is fixed to the lower rail by two bolts, is known from JP 2008-56 003 A. The two bolts are disposed in two through holes configured on the lower rail, wherein a leeway of the bolts is configured between the bolts and the respective internal circumferential face of the through hole.

A spindle/bearing assembly for a seat longitudinal gear mechanism, which has a housing that by a fastening assembly is able to be fastened to a component on the vehicle or an a component on the seat, wherein a spindle opening for routing therethrough a spindle along a spindle opening axis runs through the housing, and wherein an internal thread in the housing, in the region of the latter from the spindle opening of the latter, for engaging in a spindle routed therethrough in such a manner, is configured for adjusting the housing and the spindle relative to each other along the spindle opening axis, is known from DE 10 2008 024 141 A1. The spindle/bearing assembly provides that the internal thread is configured in a spindle nut, and the spindle nut is mounted in the housing so as to be adjustable relative to the spindle opening axis.

SUMMARY

The invention is based on the object of improving a longitudinal adjuster of the type mentioned at the outset, in particular of making available a longitudinal adjuster of which the spindle nut can be easily positioned and assembled in the longitudinal adjuster. Furthermore, it is an underlying object to provide a corresponding method for assembling a longitudinal adjuster, and a corresponding vehicle seat.

This object is achieved according to the invention by a longitudinal adjuster, having at least one pair of rails formed from a first rail and a second rail, wherein the first rail and the second rail, in particular in a longitudinal direction, are displaceable relative to each other, wherein the first rail and the second rail, while forming an internal duct, alternatingly encompass each other, wherein disposed in the internal duct are a spindle nut, connected to the second rail, and a spindle, operatively connected to the spindle nut; wherein disposed on the first rail is a spindle drive which is able to be driven by a motor and interacts with the spindle, wherein the spindle nut is fixed to the second rail by a first fixing element and a second fixing element. The spindle nut by the two fixing elements is centered perpendicularly to a longitudinal extent of the second rail, in particular in a transverse direction, in that the first fixing element is fixed relative to a first through opening, and the second fixing element is fixed relative to a second through opening.

As a result of the spindle nut by one of the two fixing elements being centered perpendicularly to a longitudinal extent of the second rail, in particular in a transverse direction, in that the first fixing element is fixed relative to a first through opening and the second fixing element is fixed relative to a second through opening, production-related tolerances when positioning and aligning the spindle nut relative to the second rail can be easily compensated for using simple means.

The longitudinal extent of the second rail preferably runs parallel to a longitudinal direction. The spindle nut is preferably centered in the transverse direction by the two fixing elements. The spindle nut is preferably horizontally centered by the two fixing elements. The transverse direction in the intended use of the longitudinal adjuster in a vehicle preferably lies in a horizontal plane, assuming that the vehicle is moving on a horizontal plane.

The first rail is preferably a seat rail which is connectable to a vehicle seat. The second rail is preferably a floor rail which is connectable to a vehicle structure. A potential construction of the spindle drive and the function of the latter are known from DE 10 2013 207 665 A1, for example, the disclosed content of said document being explicitly incorporated by way of reference.

The spindle on a front end portion of the spindle can be mounted in the spindle drive and/or on a rear end portion of the spindle be mounted in the rotary bearing of the first rail.

The spindle nut can have a main body. The spindle nut can have a continuous threaded bore having an internal thread, said threaded bore being in particular parallel to the longitudinal direction. The internal thread of the spindle nut can be operatively connected to an external thread of the spindle. The spindle is preferably screwed into the spindle nut. The spindle nut is preferably of an integral design.

The two fixing elements each can have a shank, which has an external thread, and a head portion. The two fixing elements between the shank and the end portion, in a transition region between the shank and the head portion, preferably have a cone.

The first through opening can have a substantially square cross section with radiused corners. "Substantially square" in the context of the invention is understood to mean that only a slightly difference of up to 1 millimeter in addition to a production tolerance, in particular up to 0.5 millimeter in addition to a production tolerance is possible between a length and width of the cross section. The length here is preferably measured in the longitudinal direction, and the width is preferably measured in the transverse direction.

The second through opening can have a substantially rectangular cross section with radiused corners. "Substantially rectangular" in the context of the invention is understood to mean that a difference of at least 1 millimeter in addition to the production tolerance, in particular of at least 1.5 millimeter in addition to a production tolerance, is provided between a length and width of the cross section. The length here is preferably measured in the longitudinal direction, and the width is preferably measured in the transverse direction.

The two through openings, perpendicularly to the longitudinal extent of the second rail, in particular in the transverse direction, can have the same dimension among each other. A dimension of the first through opening parallel to the longitudinal extent of the second rail can be designed so as to deviate from a dimension of the second through opening parallel to the longitudinal extent of the second rail. Parallel to the longitudinal extent is understood to mean in particular in the direction of the longitudinal extent.

The cone of the respective fixing element in a region contiguous to the respective head portion can have a diameter, in particular a maximum diameter, which is slightly larger than the dimension of the respective through opening, in particular in the transverse direction, perpendicular to the longitudinal extent of the second rail.

The dimension of the second through opening in the direction of the longitudinal extent of the second rail can be larger than a diameter, in particular a maximum diameter, of the cone of the second fixing element. In the assembled state, in the longitudinal extent of the second rail in front of and/or behind the fixing element, a gap can be present between the cone of the second fixing element and at least one peripheral portion of the second through opening. The second fixing element, in the second through opening, can have a clearance parallel to the longitudinal extent of the second rail.

For connecting to the fixing elements, the spindle nut can have in each case one fixing opening. An internal diameter of the fixing opening is preferably adapted to an external diameter of the fixing means. The fixing means can be a screw. The fixing means can be a bolt, in particular a threaded bolt.

A buffer can be disposed between the spindle nut, in particular the main body of the spindle nut, and the second rail. The buffer is preferably of a flat design. The buffer can be made from a plastics material, in particular a rubber. The buffer can be made from metal.

The buffer can be made from metal, on the one hand, and from plastics material or rubber, on the other hand. One side of the buffer here can be made from metal, and another side of the buffer can be made from plastics material and/or rubber.

The object is further achieved according to the invention by a method for assembling a longitudinal adjuster, in particular a longitudinal adjuster according to the description above, the method comprising the following method steps:

a) providing a second rail, wherein the second rail for fastening a spindle nut has a first through opening and a second through opening;

b) disposing the spindle nut on the second rail;

c) inserting, in particular screwing, from the side of the second rail that faces away from the spindle nut a first fixing element through the first through opening into the spindle nut;

d) inserting, in particular screwing, from a side of the second rail that faces away from the spindle nut a second fixing element through the second through opening into the spindle nut;

wherein at least one of the two fixing elements in a transition region between a shank and a head portion has a cone, wherein the at least one fixing element when inserting the fixing element into the assigned through opening is self-centered by the cone, in particular in a transverse direction, and the cone of the fixing element deforms a contact edge of the peripheral region of the assigned through opening, in particular for securing in the centered position.

Each of the two fixing elements in a transition region between a shank and a head portion preferably has a cone. The two fixing elements can be of identical design.

The disposing of the spindle nut on the second rail can take place while placing a buffer therebetween. The buffer is preferably of a flat design. The buffer can be made from a plastics material, in particular a rubber. The buffer can be made from metal. The buffer can be made from metal, on the one hand, and from plastics material or rubber, on the other hand. One side of the buffer here can be made from metal, and another side of the buffer can be made from plastics material and/or rubber.

The first fixing element, while inserting the first fixing element into the first through opening, can be self-centered in the first through opening by the cone, both parallel to a longitudinal extent of the second rail as well as perpendicularly thereto, in particular in the transverse direction. The second fixing element, when inserting the second fixing element into the second through opening, can be self-centered in the second through opening by the cone, preferably exclusively perpendicularly to the longitudinal extent of the second rail, in particular in the transverse direction.

The object is furthermore achieved according to the invention by a vehicle seat having a longitudinal adjuster described above.

In summary, and in other words, fastening of the spindle nut to the lower rail in the prior art is typically performed using two to three screws. The fastening holes in the lower rail for these screws, in terms of the diameter, are larger than a shank of the screw in order to compensate for tolerances and to guarantee clean bearing by the head of a screw head of the screws. As a result however, during the screw-fitting process it is necessary for the spindle nut to be actively aligned within the lower rail by way of additional receptacles.

According to the present invention, the screws for fastening the spindle nut can have a cone between the screw head and the shank of the respective screw. This cone is preferably conceived such that it achieves centering of the screw across all tolerances in the transverse direction to a corresponding through opening in the lower rail.

In order for the screw to be able to be tightened until the head comes to bear, the through opening can be embodied such that the cone is in contact with a peripheral region of the through opening of the lower rail only by way of a minor contact face, in particular in a narrow portion. This can take place by way of a rectangular hole which in relation to the transverse direction of the lower rail has almost the same dimension as in the longitudinal direction. A second rectangular hole has a narrower dimension in the transverse direction of the lower rail and is slightly larger in the longitudinal direction of the lower rail. As a result, the second rectangular hole has a clearance in the longitudinal direction in order to be able to compensate for longitudinal tolerances. As a result of the minor contact face, the cone of the screw can deform the contact edge in the through opening, and the head face of the screw comes to bear securely thereon.

BRIEF DESCRIPTION OF THE FIGURES

The invention is explained in more detail hereunder by way of an advantageous exemplary embodiment illustrated in the figures. However, the invention is not limited to this exemplary embodiment. In the figures.

DETAILED DESCRIPTION

Figure 1:
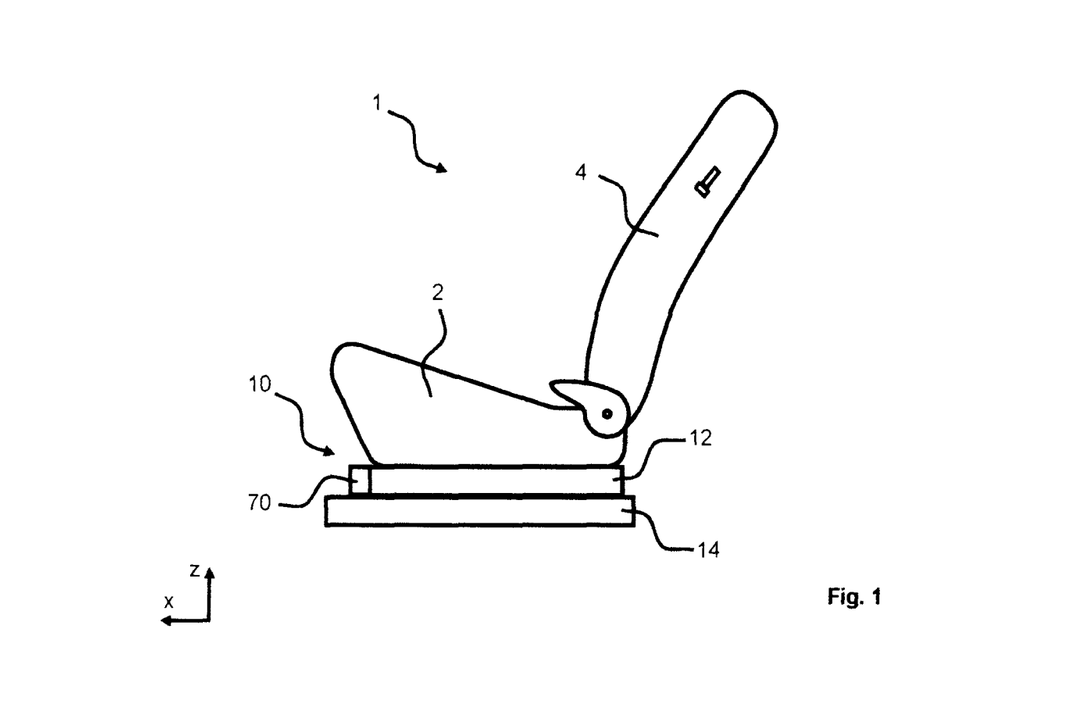
FIG. 1 shows a vehicle seat according to the invention.

A vehicle seat 1 which is schematically illustrated in FIG. 1 will be described hereunder using three spatial directions running in a mutually perpendicular manner. In a vehicle seat 1 installed in the vehicle, a longitudinal direction x runs so as to be largely horizontal and preferably parallel to a vehicle longitudinal direction, the latter corresponding to the usual travel direction of the vehicle. A transverse direction y, running so as to be perpendicular to the longitudinal direction x, is likewise horizontally aligned and runs parallel to a vehicle transverse direction. A vertical direction z runs so as to be perpendicular to the longitudinal direction x and perpendicular to the transverse direction y. In a vehicle seat 1 installed in the vehicle, the vertical direction z runs so as to be parallel to the vehicle vertical axis. The longitudinal direction x and the transverse direction y can define a horizontal plane.

The positional indications and directional indications used such as, for example, front, rear, top and bottom relate to a viewing direction of a passenger assuming a normal sitting position in the vehicle seat 1, wherein the vehicle seat 1, when installed in the vehicle, is aligned in a use position suitable for transporting passengers, having an upright backrest 4 and as usual in the travel direction. However, the vehicle seat 1 may also be installed in an alignment deviating therefrom, for example transversely to the travel direction.

The vehicle seat 1, shown in FIG. 1, for a motor vehicle has a seat part 2 and a backrest 4 which in terms of the inclination of the latter is adjustable relative to the seat part 2. An inclination of the backrest 4 can be adjustable by a latching mechanism or a gearbox mechanism, for example. For adjusting a seat longitudinal position, the vehicle seat 1 is assembled on a longitudinal adjuster 10.

Figure 2:
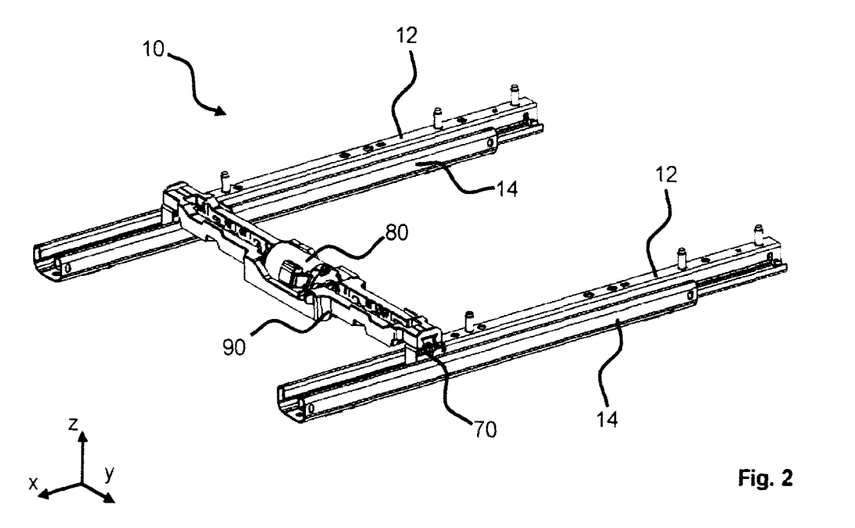
FIG. 2 shows a perspective view of a longitudinal adjuster according to the invention of the vehicle seat from FIG. 1.
Figure 3:
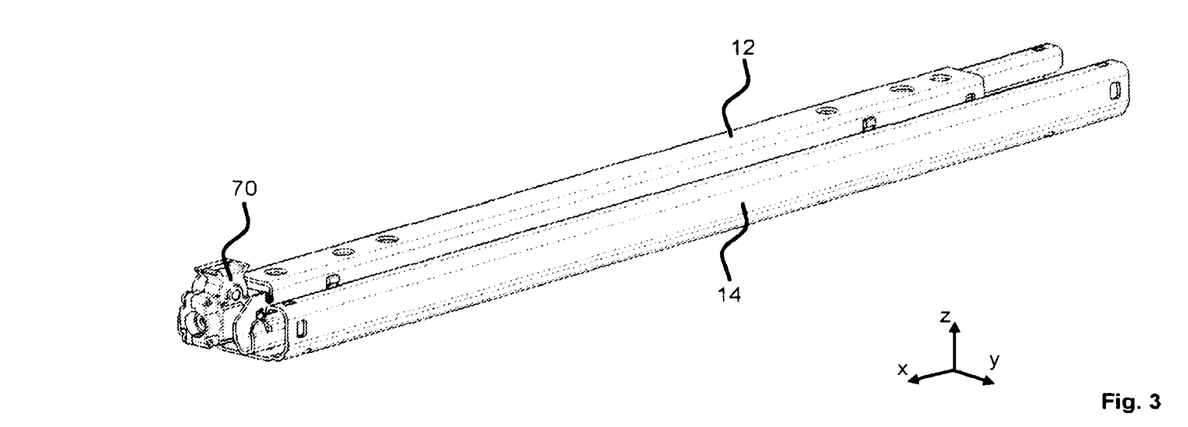
FIG. 3 shows a perspective view of a pair of rails of the longitudinal adjuster from FIG. 2.

FIG. 2 shows the longitudinal adjuster 10 according to the invention of the vehicle seat 1. The longitudinal adjuster 10 has at least one pair of rails, presently two pairs of rails. FIG. 3 shows one of the pairs of rails of the longitudinal adjuster 10.

The pairs of rails are in each case formed from a first rail 12, in particular for connecting to a seat structure of the vehicle seat 1, and second rail 14, in particular for connecting to a vehicle structure. The rails 12, 14 of the pair of rails are displaceable relative to each other in the longitudinal direction x and, while forming an internal duct 16, alternatingly encompass each other. Disposed in the internal duct 16 are a spindle nut 30 which is mounted on the second rail 14, presently disposed thereon in a rotationally fixed manner, and a spindle 20 which is operatively connected to the spindle nut 30. The spindle 20 along a spindle axis S extends so as to be parallel to the longitudinal direction x. Disposed on a front end of the first rail 12 is a spindle drive 70 which is able to be driven by a motor 80 and drives the spindle 20. The motor 80 is held on a motor support 90, which is assembled between the two spindle drives 70 of the respective pairs of rails, and by a shaft not illustrated in FIG. 2 drives the two spindle drives 70.

Figure 4:
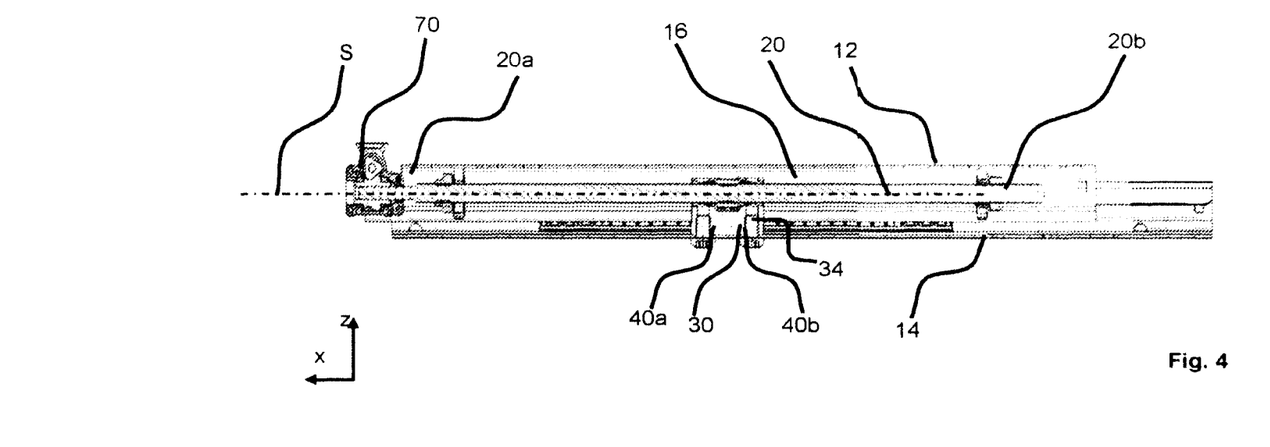
FIG. 4 shows a longitudinal section of the pair of rails from FIG. 3.

FIG. 4 shows a longitudinal section of the pair of rails of FIG. 3. The spindle drive 70 mounts a front end portion 20a of the spindle 20. The spindle nut 30, in the state presently illustrated, is disposed so as to be centric along the length of the spindle 20. By rotating the spindle 20 about the spindle axis S, the spindle nut 30 as a function of the rotating direction is driven along an external thread of the spindle 20 in or counter to the longitudinal direction x and, as a result, displaces the first rail 12 relative to the second rail 14. A relative position between the spindle 10 and the spindle nut 30 is also correspondingly displaced in the process. The spindle nut 30, parallel to the longitudinal direction x, has a continuous threaded bore with an internal thread 32. The internal thread 32 of the spindle nut 30 can be operatively connected to an external thread of the spindle 20. The spindle nut 30 presently is of an integral design.

FIGS. 5 to 8 show various views of a second rail 14 having a buffer 60, the spindle nut 30 and two fixing elements 40*a*, 40*b*.

The spindle nut 30 presently is of an integral design. The spindle nut 30 is fastened to the second rail 14 by the two fixing elements 40*a*, 40*b*. The spindle nut 30, by the two fixing elements 40*a*, 40*b*, relative to a respective through opening 14*a*, 14*b* of the second rail 14, in particular a first through opening 14*a* and a second through opening 14*b*, is centered perpendicularly to a longitudinal extent of the second rail 14. The spindle nut 30, by the two fixing elements 40*a*, 40*b*, is horizontally centered if the longitudinal extent of the second rail 14 runs parallel to the longitudinal direction x. The spindle nut 30, in particular in the transverse direction y, is centered by the two fixing elements 40*a*, 40*b*.

The spindle nut 30 has one fixing opening 34 for each of the fixing elements 40*a*, 40*b*. A buffer 60 is disposed between the second rail 14 and the spindle nut 30. For each of the two fixing elements 40*a*, 40*b* the buffer 60 has in each case one through hole. In the assembled state, peripheral regions of the through holes of the buffer 60 are not necessarily in contact with the fixing elements 40*a*, 40*b*.

The first fixing element 40*a* and the second fixing element 40*b* presently are screws. The first fixing element 40*a* and the second fixing element 40*b* are mutually identical parts. The two fixing elements 40*a*, in a transition region between a shank 42 and a head portion 44, each have a cone 46. The shank 42 of each one of the fixing elements 40*a*, 40*b* presently has an external thread.

Figure 5:
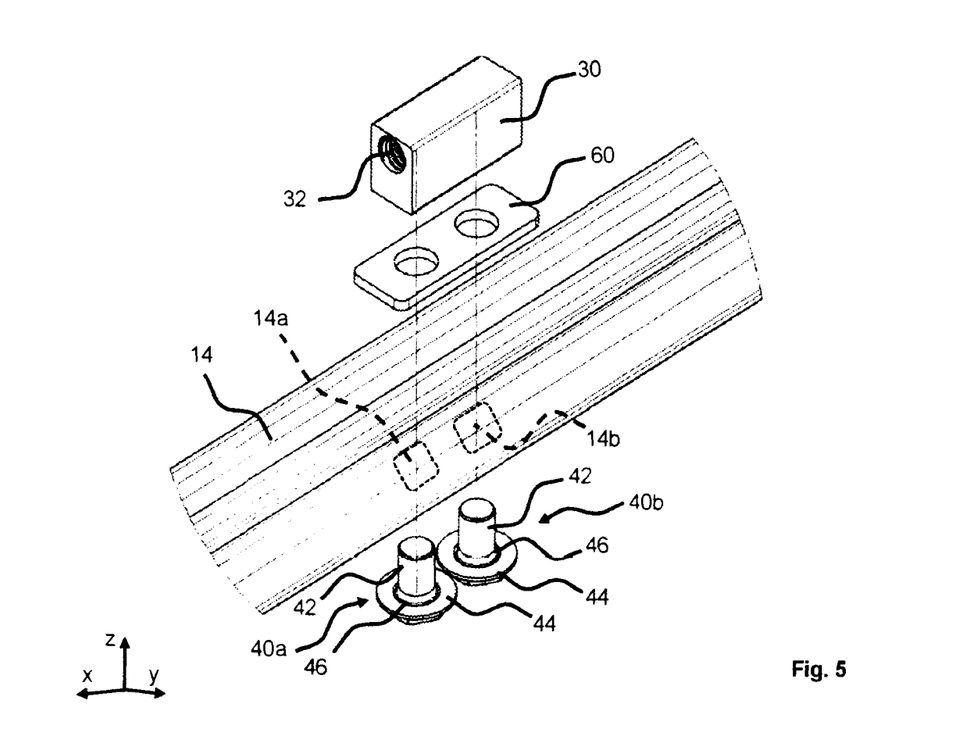
FIG. 5 shows fragments of an exploded illustration of the pair of rails from FIG. 3, illustrating a second rail, a buffer, a spindle nut and two fixing elements.
Figure 6:
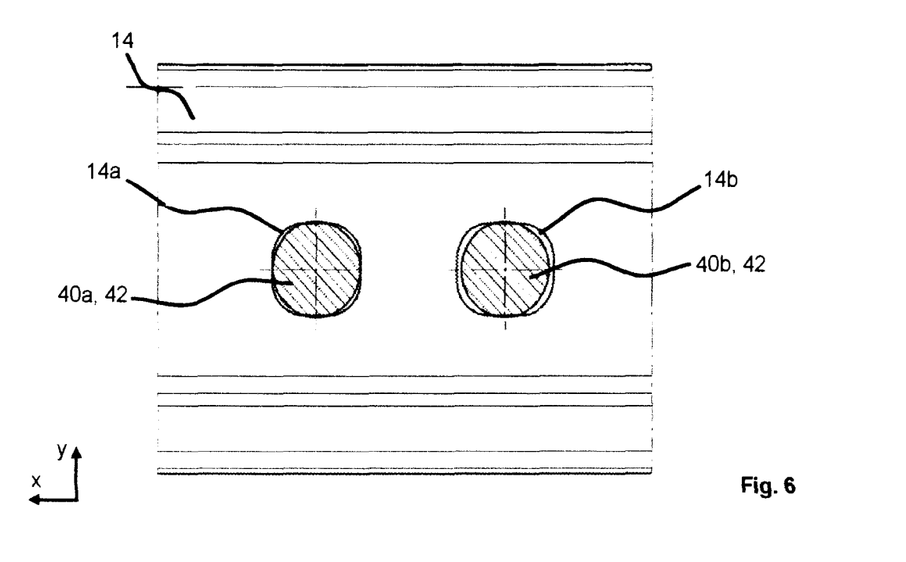
FIG. 6 shows a partially sectional view from above onto the fixing elements disposed in the second rail.
Figure 7:
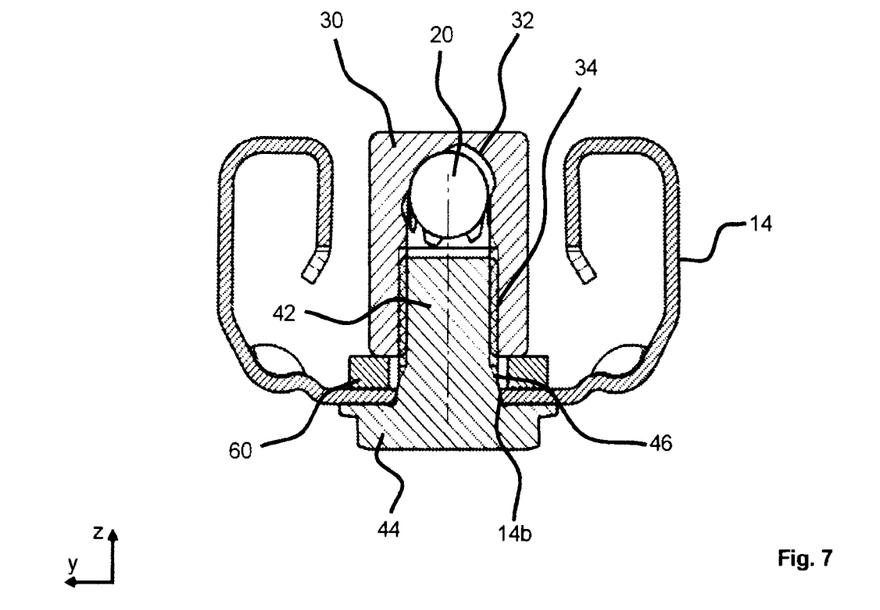
FIG. 7 shows a cross section through the spindle nut of the pair of rails from FIG. 3.
Figure 8:
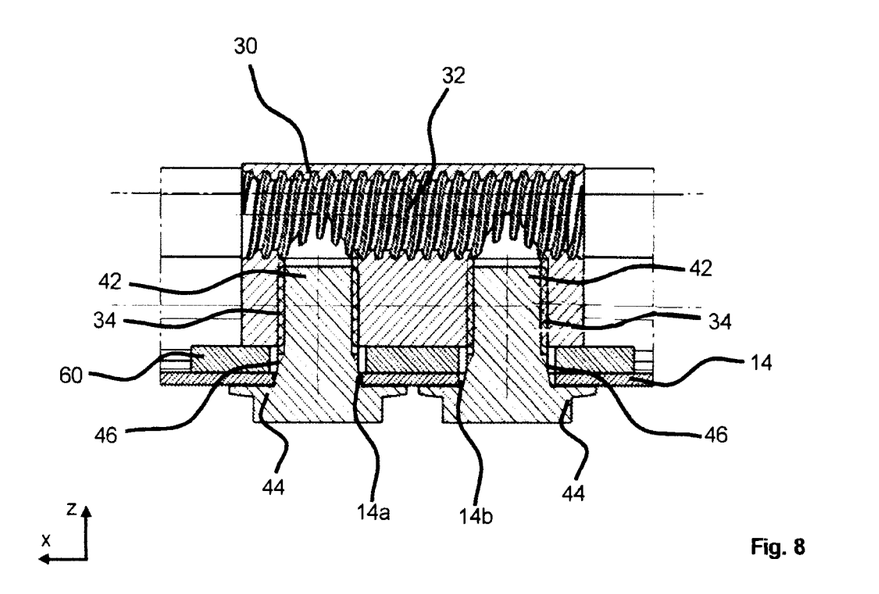
FIG. 8 shows fragments of an enlargement of the illustration of FIG. 4 in the region of the spindle nut.

The first through opening 14*a*, in particular prior to assembling the spindle nut 30 and the first fixing element 40*a*, has a substantially square cross section with radiused corners. The first fixing element 40*a* is disposed in the first through opening 14*a*. Prior to assembling the spindle nut 30 and the first fixing element 40*a*, the dimension of the first through opening 14*a* perpendicular to the longitudinal extent of the second rail 14, in particular in the transverse direction y, is designed so as to be slightly smaller than the largest diameter of the cone 46 of the first fixing element 40*a* in a region contiguous to the head portion 44 of the first fixing element 40*a*. In a state prior to assembling the first fixing element 40*a*, the dimension of the first through opening 14*a* parallel to the longitudinal extent of the second rail 14 is identical to the dimension of the first through opening 14*a* perpendicular to the longitudinal direction of the second rail 14, in particular in the transverse direction y.

During the assembling of the spindle nut 30 and of the first fixing element 40*a*, a slight deformation of the peripheral regions of the first through opening 14*a* that are contacted by the cone 46 takes place by the cone 46 of the first fixing element 40*a*. In the assembled state of the first fixing element 40*a*, the peripheral regions of the first through opening 14*a* that are contacted by the cone 46, as a result of displacement by cone 46, are deformed in such a manner that the cone 46 of the first fixing element 40*a* comes to bear securely on the peripheral regions of the first through opening 14*a*, and the head portion 44 of the first fixing element 40*a* comes to bear securely on the second rail 14.

The second through opening 14*b* has a substantially rectangular cross section with radiused corners. The second fixing element 40*b* is disposed in the second through opening 14*b*. Prior to assembling the spindle nut and the second fixing element 40*b*, the dimension of the second through opening 14*b*, in particular in the transverse direction y, perpendicular to the longitudinal extent of the second rail 14, is designed so as to be slightly smaller than the largest diameter of the cone 46 of the second fixing element 40*b* in a region contiguous to the head portion 44 of the second fixing element 40*b*. The dimension of the second through opening 14*b*, parallel to the longitudinal extent of the second rail 14, is larger than the largest diameter of the cone 46 of the second fixing element 40*b*.

A clearance is provided parallel to the longitudinal extent of the second rail 14, between the second fixing element 40*b* and the peripheral regions of the second through opening 14*b*.

While assembling the spindle nut 30 and the second fixing element 40*b*, a slight deformation of the peripheral regions of the second through opening 14*b* that are contacted by the cone 46, in particular the peripheral regions of the second through opening 14*b* that are laterally disposed so as to be parallel to the longitudinal extent of the second rail 14, takes place by the cone 46 of the second fixing element 40*b*. In the assembled state of the second fixing element 40*b*, the peripheral regions of the second through opening 14*b* that are contacted by the cone 46, as a result of being displaced by the cone 46, are deformed in such a manner that the cone 46 of the second fixing element 40*b* is aligned so as to be centric between the contacted opposite peripheral regions of the second through opening 14*b*, and the head portion 44 of the second fixing element comes to bear securely on the second rail 14.

The features disclosed in the above description, the claims and the drawings can be important both individually as well as in combination in order to implement the invention in its various design embodiments.

LIST OF REFERENCE SIGNS

1 Vehicle seat
2 Seat part
4 Backrest
10 Longitudinal adjuster
12 First rail
14 Second rail
14*a* First through opening
14*b* Second through opening
16 Internal duct
20 Spindle
20*a* Front end portion (of the spindle 20)
20*b* Rear end portion (of the spindle 20)
30 Spindle nut
32 Internal thread
34 Fixing opening
40*a* First fixing element
40*b* Second fixing element
42 Shank
44 Head portion
46 Cone
60 Buffer
70 Spindle drive
80 Motor
90 Motor support S Spindle axis (of the spindle 20)
x Longitudinal direction
y Transverse direction
z Vertical direction

What is claimed:

1. A longitudinal adjuster, comprising:
at least one pair of rails formed from a first rail and a second rail, wherein the first rail and the second rail, in particular in a longitudinal direction, and are displaceable relative to each other, wherein the first rail and the second rail form an internal duct, wherein the internal duct comprises a spindle nut, connected to the second rail, and a spindle, operatively connected to the spindle nut; wherein the first rail comprises a spindle drive which is able to be driven by a motor and interacts with the spindle, wherein the spindle nut is fixed to the second rail by a first fixing element and a second fixing element, wherein the spindle nut by the two fixing elements is centered perpendicularly to a longitudinal extent of the second rail, in a transverse direction, wherein the first fixing element is fixed relative to a first through opening in the second rail, and the second fixing element is fixed relative to a second through opening in the second rail,
wherein the first fixing element relative to the first through opening, and the second fixing element relative to the second through opening, are centered perpendicularly to the longitudinal extent of the second rail,
wherein the two fixing elements each have a shank, which has an external thread, and a head portion, wherein a transition region between the shank and the head portion has in each case one cone, wherein the fixing elements each have the same size and shape,
wherein the first through opening has a different shape than the second through opening in the longitudinal direction,
wherein each cone longitudinally centers the fixing element in the assigned through opening despite the assigned through openings having different shapes compared to one another,
wherein the cones of the fixing elements deform first and second longitudinal contact edges of peripheral regions of the respective through openings,
wherein at least one longitudinal gap is located between the cone of the second fixing element and a transverse contact edge of the second through opening to provide a longitudinal tolerance for the spindle nut relative to the second rail.

2. The longitudinal adjuster as claimed in claim 1, wherein the first through opening has a substantially square cross section with radiused corners.

3. The longitudinal adjuster as claimed in claim 1, wherein the second through opening has a substantially rectangular cross section with radiused corners.

4. The longitudinal adjuster as claimed in claim 1, wherein the dimensions of the two through openings, in particular in the transverse direction and perpendicular to the longitudinal extent of the second rail and are identical.

5. The longitudinal adjuster as claimed in claim 1, wherein the cone of the respective fixing element in a region contiguous to the respective head portion has a diameter, wherein prior to assembling the fixing element the dimension of the respective through opening, in particular in the transverse direction, perpendicular to the longitudinal extent of the second rail and has a diameter smaller than the diameter of the cone.

6. The longitudinal adjuster as claimed in claim 1, wherein the dimension of the second through opening in the direction of the longitudinal extent of the second rail is larger than the diameter of the cone of the second fixing element.

7. The longitudinal adjuster as claimed in claim 1, wherein a buffer is disposed between the second rail and the spindle nut.

8. A vehicle seat having a longitudinal adjuster as claimed in claim 1.

* * * * *